US008756170B2

(12) United States Patent
Chen et al.

(10) Patent No.: US 8,756,170 B2
(45) Date of Patent: Jun. 17, 2014

(54) REGULAR EXPRESSION MATCHING METHOD AND SYSTEM

(75) Inventors: Jian Chen, Nanjing (CN); Xinyu Hu, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 442 days.

(21) Appl. No.: 13/115,400

(22) Filed: May 25, 2011

(65) Prior Publication Data

US 2011/0295779 A1 Dec. 1, 2011

(30) Foreign Application Priority Data

May 25, 2010 (CN) .......................... 2010 1 0187552

(51) Int. Cl.
*G06N 99/00* (2010.01)
(52) U.S. Cl.
CPC .................................... *G06N 99/005* (2013.01)
USPC ........................................................... 706/12
(58) Field of Classification Search
USPC .................................... 706/12; 382/103, 224
See application file for complete search history.

(56) References Cited

U.S. PATENT DOCUMENTS

| 7,225,188 | B1 | 5/2007 | Gai |
| 7,689,530 | B1 | 3/2010 | Williams, Jr. et al. |
| 2002/0172486 | A1 | 11/2002 | Fermann |
| 2008/0071765 | A1 | 3/2008 | Ichiriu |
| 2008/0270342 | A1 | 10/2008 | Ruehle |
| 2009/0083265 | A1 | 3/2009 | Michailov |
| 2009/0172001 | A1 | 7/2009 | McMillen |
| 2011/0258210 | A1* | 10/2011 | Agarwal et al. ............... 707/758 |

FOREIGN PATENT DOCUMENTS

| CN | 101075980 A | 11/2007 |
| CN | 101442540 A | 5/2009 |
| CN | 101599074 A | 12/2009 |
| CN | 101639861 A | 2/2010 |

OTHER PUBLICATIONS

Supplementary European Search Report dated (mailed) Jul. 4, 2010, issued in related Application No. 08748671.8-1237, PCT/CN2008071069, filed May 23, 2008, Hauwei Technologies Co., Ltd.
Junghoo Cho et al., A Fast Regular Expression Indexing Engine, IEEE Computer Society, IBM Almaden Research, Proceedings of the 18th International Conference on Data Engineering (ICDE), 2002, pp. 1-12.
Fang Yu et al., Fast and Memory-Efficient Regular Expression Matching for Deep Packet Inspection, ANCS, Dec. 3-5, 2006, San Jose, California, pp. 93-102.
Sidhu, et al., Fast Regular Expression Matching using FPGAs; Department of EE-Systems, University of Southern Carolina (12 pgs.)

* cited by examiner

*Primary Examiner* — Li-Wu Chang
*Assistant Examiner* — Ola Olude Afolabi
(74) *Attorney, Agent, or Firm* — Brinks Gilson & Lione

(57) ABSTRACT

The present invention discloses a regex matching method and system, and relates to the field of computer technologies. The method includes: sorting multiple regexes into several regex groups, where all regexes in one regex group include a common string, which is known as a generic string; compiling each regex group into a DFA, and setting up a correlation between the generic string of each regex group and the DFA; matching to-be-matched data streams with the generic string respectively, and using the matched generic string as a matched string; obtaining a DFA corresponding to the matched string; and performing regex matching for the to-be-matched data streams according to the DFA, and outputting a matching result. The embodiments of the present invention shorten the data loading process, decrease the time consumed by data loading, and improve the matching performance.

11 Claims, 4 Drawing Sheets

REGULAR EXPRESSION MATCHING METHOD AND SYSTEM

CROSS-REFERENCE TO RELATED APPLICATION

This application claims priority to Chinese Patent Application No. 201010187552.X, filed on May 25, 2010, which is hereby incorporated by reference in its entirety.

FIELD OF THE INVENTION

The present invention relates to data processing, and in particular, to a regular expression (regex) matching method and system.

BACKGROUND OF THE INVENTION

A regex describes a mode of matching strings, and is designed to match texts by searching a set of strings for the part that matches the given regex. The regex is widely applicable. In the communication industry, the regex is applied to mode matching for the data traffic, for example, protocol resolution, virus detection and service categorization.

In the prior art, before regex matching, the regex needs to converted into a Deterministic Finite Automata (DFA) first, and then the logical chip executes the DFA according to the compiled DFA and strings in the input data stream. In practical application, more than one check rule exists, and even tens of thousands of check rules exist. It is impossible to use DFA to check the to-be-matched traffic for tens of thousands of times. To avoid omission of the check rules, the tens of thousands of rules are compiled into a large DFA (which is generally of several hundreds of megabytes or even of 1 G). In the matching process, the to-be-matched traffic is used as input, and the output of the DFA report is used as matching rule.

After analyzing the prior art, the inventor finds at least the following defects in the prior art:

A large DFA is several hundreds of megabytes in size, the on-chip memory of such a capacity is too big to be integrated into an ordinary logical chip, and can be stored in an external Static Random Access Memory (SRAM) or Synchronous Dynamic Random Access Memory (SDRAM) only. In the matching process, once a state is matched, the corresponding DFA fragment of this state is loaded into the cache in the logical chip; the data table entries correlated with the current state keep being loaded in the matching process, and the state-related data table entries are often loaded repeatedly due to state transition; the more complex the DFA is, the more data table entries are to be loaded. Such a matching method consumes too much time and too many storage resources, and brings low performance of matching.

SUMMARY OF THE INVENTION

The embodiments of the present invention provide a regex matching method and system. The technical solution under the present invention is as follows:

A regex matching method includes:
sorting multiple regexes into several regex groups, where all regexes in one regex group include a common string, which is known as a generic string;
compiling each regex group into a DFA, and setting up a correlation between the generic string of each regex group and the DFA;
matching to-be-matched data streams with the generic string respectively, and using the matched generic string as a matched string;
obtaining a DFA corresponding to the matched string; and performing regex matching for the to-be-matched data streams according to the DFA, and outputting a matching result.

A regex matching system includes:
a grouping and compiling device, configured to: sort multiple regexes into several regex groups, where all regexes in one regex group include a common string, which is known as a generic string; and compile each regex group into a DFA, and set up a correlation between the generic string of each regex group and the DFA; and
a matching device, configured to: match to-be-matched data streams with the generic string respectively, and use the matched generic string as a matched string; obtain a DFA corresponding to the matched string; and perform regex matching for the to-be-matched data streams according to the DFA, and output a matching result.

The technical solution under the present invention brings at least the following benefits:

Multiple regexes are sorted into groups according to the string, and each regex group is compiled respectively so that multiple DFAs are obtained; the to-be-matched data streams are matched with the generic string respectively; and the matching result is used to load the DFA in order to perform regex matching. In this way, the data that needs to be loaded in the matching process is reduced, the loading process is shortened, the time consumed by data loading in the process of regex matching is decreased, and the matching performance is improved.

BRIEF DESCRIPTION OF THE DRAWINGS

To make the technical solution under the present invention or in the prior art clearer, the following outlines the accompanying drawings involved in the description of the embodiments of the present invention or the prior art. Apparently, the accompanying drawings outlined below are illustrative rather than exhaustive, and persons of ordinary skill in the art can derive other drawings from such accompanying drawings without creative efforts.

DETAILED DESCRIPTION OF THE EMBODIMENTS

To make the technical solution, objectives and merits of the present invention clearer, the following describes the embodiments of the present invention in more detail with reference to the accompanying drawings.

Before going into the details of the regex matching method provided in the present invention, the following gives a brief introduction to the working mode of the regex:

A regex generally includes a quantifier indicating the count of matching, an anchor indicating the specific position, and a string.

Here is an example of regex: .*AUTH[0-9] {10}. This regex is intended for searching a to-be-matched text for an AUTH string which is immediately followed by 10 digit characters, each digit character falling within 0-9. Therefore, the matched text may be http://AUTH2009120901.html/~index, where the bold characters are a string that matches the regex.

Figure 1:
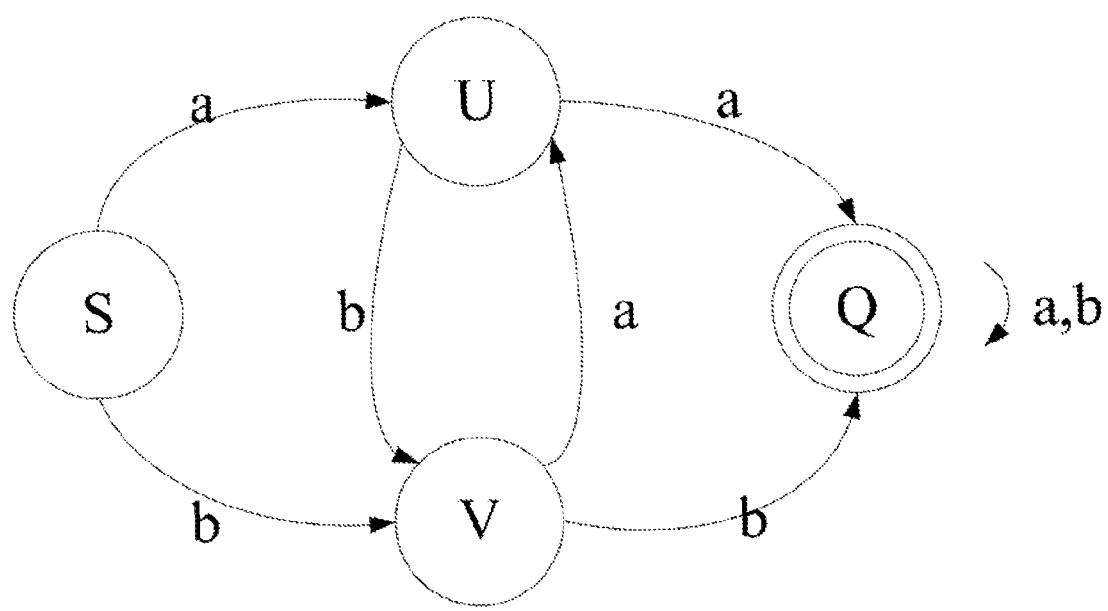
FIG. 1 is a schematic diagram showing state of DFA in the prior art.

As shown in FIG. 1, a DFA is actually an automatic state machine, and is composed of multiple states (small circle in the figure), input (characters indicated by the arrow) of each state, and a conversion edge (arrow). In each state, a specific input leads to a specific output definitely. For example, in the S state in FIG. 1, input "a" leads to the U state definitely.

Embodiment 1

Figure 2:
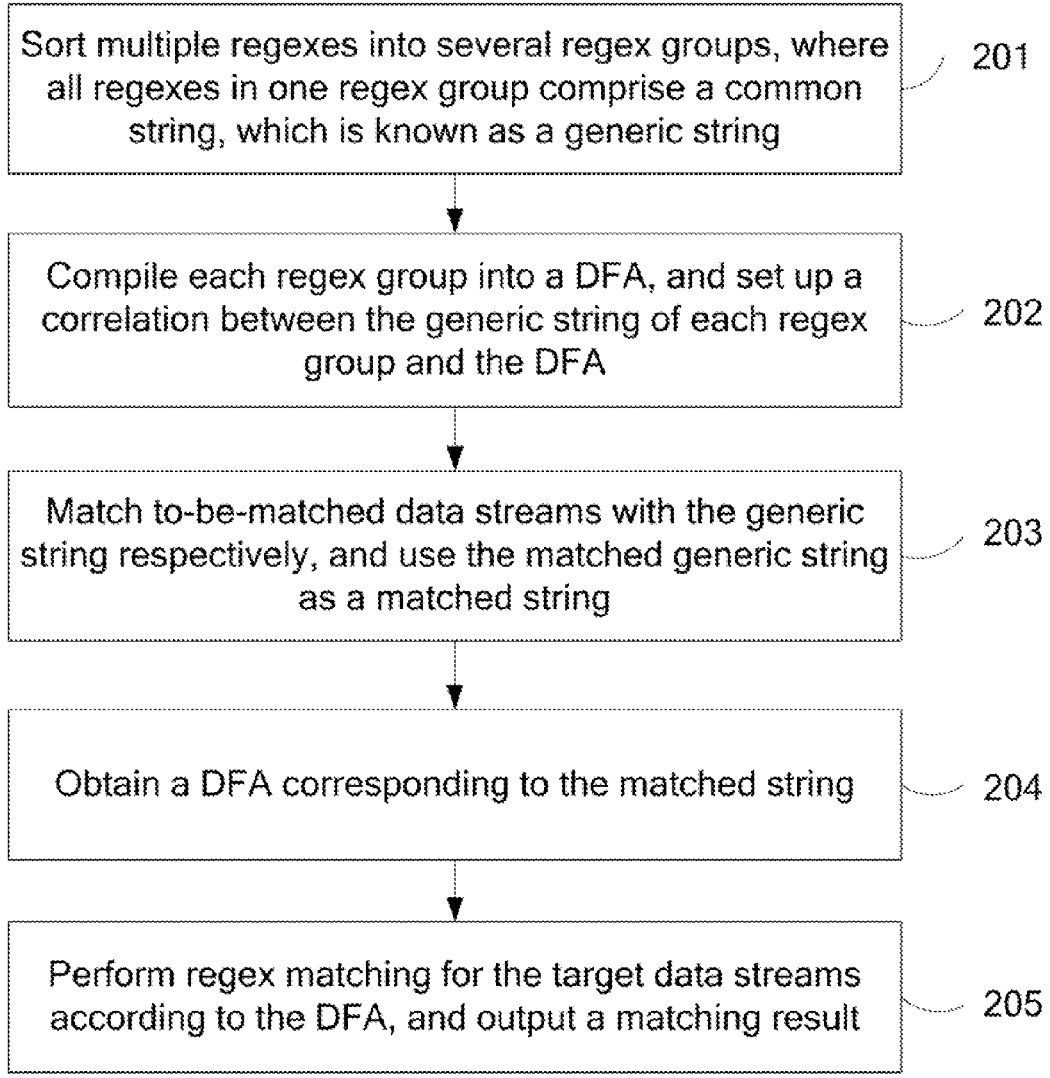
FIG. 2 shows a regex matching method according to a first embodiment of the present invention.

A regex matching method is provided in an embodiment of the present invention to shorten the time consumed by data loading in the regex matching process and improve the matching performance. As shown in FIG. 2, the method includes the following steps:

201. Sort multiple regexes into several regex groups, where all regexes in one regex group include a common string, which is known as a generic string.

202. Compile each regex group into a DFA, and set up a correlation between the generic string of each regex group and the DFA.

203. Match to-be-matched data streams with the generic string respectively, and use the matched generic string as a matched string.

204. Obtain a DFA corresponding to the matched string.

205. Perform regex matching for the to-be-matched data streams according to the DFA, and output a matching result.

The string mentioned herein refers to the meaning represented by a combination of printable characters and non-printable characters in the regex. For example, in the following regex: .*AUTH[0-9]{10}, the string may be auth, namely, the data of the regex includes "auth" necessarily, which, however, is not limited herein.

In this embodiment, multiple regexes are sorted into groups according to the string, and each regex group is compiled respectively so that multiple DFAs are obtained; the to-be-matched data streams are matched with the generic strings respectively; and the matching result is used to load the DFA in order to perform regex matching. In this way, the data that needs to be loaded in the matching process is reduced, the loading process is shortened, the time consumed by data loading in the process of regex matching is decreased, and the matching performance is improved.

Embodiment 2

Figure 3:
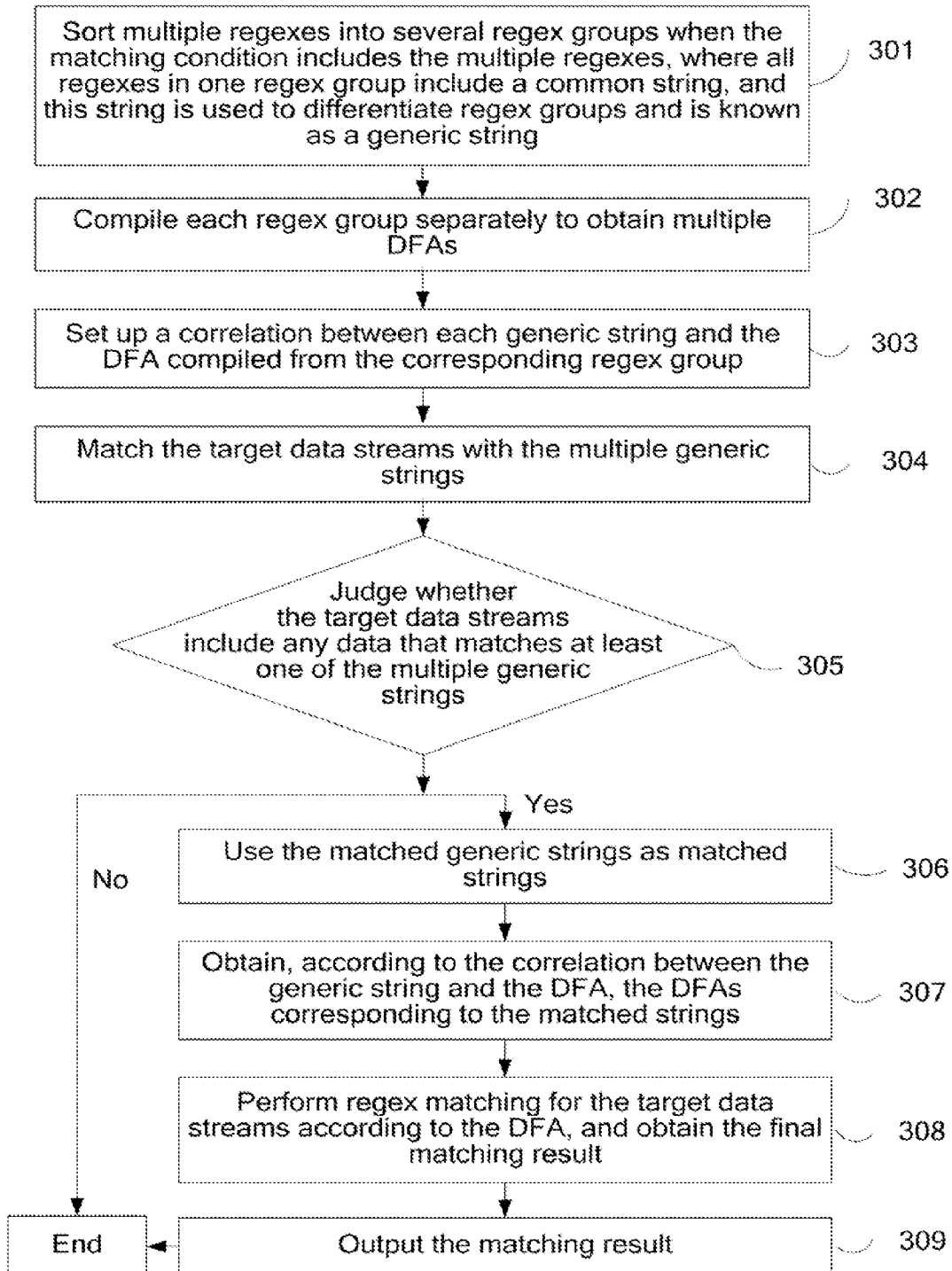
FIG. 3 shows a regex matching method according to a second embodiment of the present invention.

A regex matching method is provided in an embodiment of the present invention to shorten the time consumed by data loading in the regex matching process and improve the matching performance. As shown in FIG. 3, the method includes the following steps:

301. Sort multiple regexes into several regex groups when the matching condition includes the multiple regexes, where all regexes in one regex group include a common string, and this string is used to differentiate regex groups and is known as a generic string.

In step 301, any regexes that include the same string are sorted into a group, regardless of the string itself.

For example, if a string indicating that "data needs to include ace" exists in two regexes, the two regexes are sorted into a group.

Further, if the regexes that include the same string are more than a preset threshold, these regexes are sorted into multiple groups, each group consisting of the regexes less than the preset threshold. Therefore, in subsequent steps, the compiled DFA is not too great.

For example, if 12 regexes include the same string, and a preset threshold of the number of regexes in a regex group is 10, the 12 regexes may be divided into two groups. Each of the two groups includes 6 regexes; or, one group includes 10 regexes, and the other includes 2 regexes. The user may preset the detailed grouping method, which is not limited herein.

302. Compile each regex group separately to obtain multiple DFAs.

Those skilled in the art know that in practice, the DFA is in a large size, and one or more regexes that have the same string may be compiled into a small-sized DFA, and therefore, a very large-sized DFA is compiled into plenty of small-sized DFAs.

Preferably, the size of the DFA is not greater than the cache space available for buffering the DFA fragments inside the logical chip. In this way, at least one small-sized DFA can be loaded smoothly at a single attempt in the subsequent loading step. If the compiled DFA is greater than the cache space available for buffering the DFA inside the logical chip, those skilled in the art know that the loading mode is diverse, and is not limited herein. Besides, the number of regexes compiled into a DFA may be set according to the design requirements, and is not limited herein.

It should be noted that the compiling process may be understood as a process of grouping the regexes and then compiling them. In order to improve the precision of matching, the number of regex groups may be controlled by a threshold. This threshold may be set according to the system configuration, and is not limited herein.

303. Set up a correlation between each generic string and the DFA compiled from the corresponding regex group.

Those skilled in the art know that the correlation comes in many forms. Specifically, the correlation may be a list stored in the memory. In this list, a generic string corresponds to a DFA uniquely. The correlation is not limited herein.

For example, if all regexes in the regex group A include an "ace" string, after the regex group A is compiled into the DFA A', a correlation is set up between the generic string "ace" and the DFA A'.

It should be noted that when a generic string corresponds to multiple regexes, a correlation may be set up between the generic string and the multiple DFAs.

Specifically, the step of setting up a correlation between each generic string and the DFA compiled from the corresponding regex group includes: setting up a mapping relation between the generic string and the address for storing the DFA compiled from the regex group. Therefore, the DFA can be loaded smoothly according to the mapping relation in subsequent steps, and the DFA loading is quicker and more accurate. Preferably, the generic string is mapped onto a short fixed-length value space through a Hash function. Because the Hash function is vulnerable to Hash collision, an address may be mapped to several original values of generic strings and the addresses for storing the DFAs. In subsequent steps, the address for storing the DFA can be found by matching the original value of the generic string.

The Hash operation refers to converting input of any length into a fixed-length output through a Hash algorithm. The output is a Hash value. Such conversion is a compressed mapping. The space of the Hash value is generally far less than the space of the input. Different inputs may be converted into the same output through the Hash algorithm, and it is impossible to determine an input value according to a Hash value. In other words, the Hash operation is intended to find a mapping relation between content of data and the address for storing the data. In this embodiment, the Hash function operation saves the data space, and quickens the loading.

Preferably, steps 301-302 are performed by a computer. Further, multiple compiled DFAs are stored in an external storage so that they are available in the subsequent loading. Those skilled in the art know that the external storage refers to a storage outside Field Programmable Gate Array (FPGA), for example, Double Data Rate SDRAM (DDR SDRAM), and may also be understood as a memory of a general computer.

304. Match to-be-matched data streams with the multiple generic strings.

Those skilled in the art know that the matching method refers to the process of matching data with the string.

305. Judge whether the to-be-matched data streams include any data that matches at least one of the multiple generic strings:

if the to-be-matched data streams include any data that matches at least one of the multiple generic strings, the process proceed to step 306; and if the to-be-matched data streams do not include any data that matches at least one of the multiple generic strings, the process ends.

In this embodiment, before the regex matching, the to-be-matched data streams are checked against the generic strings one by one, and the possibly matched regexes is determined beforehand, which shortens the loading time drastically.

In this case, if the to-be-matched data streams include any data that matches a generic string, it indicates that the to-be-matched data streams include the data that matches the regex. In this process, the to-be-matched data streams are matched roughly first.

It should be noted that if the to-be-matched data streams include no data that matches any of the generic strings, it indicates that the to-be-matched data streams do not match any of the regexes, and the matching process ends.

306. Use the matched generic strings as matched strings.

307. Obtain, according to the correlation between the generic string and the DFA, the DFAs corresponding to the matched strings.

Further, step 307 may be: obtaining, according to the mapping relation between the matched string and the address for storing the DFA, the DFAs corresponding to the matched strings. In practice, this step may be: check the original value of the string according to the mapping relation, obtain the address for storing the DFA, and load the DFA in the address into the cache (memory). The cache refers to BRAM resources in the FPGA, and is characterized by small capacity and high speed. The cache may be understood as the cache in a general computer.

Those skilled in the art know that the mapping relation may be implemented in other ways. For example, in step 303, the generic strings and the DFAs are numbered, and their mapping relations are stored in a table, and subsequently, the DFAs that need to be loaded can be searched out according to the relation indicated by the numbers in the table. The method of implementing the mapping relation is not limited herein.

308. Perform regex matching for the to-be-matched data streams according to the DFA, and obtain the final matching result.

Those skilled in the art know that "regex matching" refers to the operation of judging whether the input content includes the rules represented by the regex. Generally, an input string is used to express the input parameter of the regex matching system, and the matching result is used to express the output result of the regex matching system.

309. Output the matching result. The process ends.

Preferably, steps 303-309 may be performed by an FPGA in a programmable logical chip or by a program component of similar functions.

In this embodiment, multiple regexes are sorted into groups according to the string, and each regex group is compiled respectively so that multiple DFAs are obtained; the to-be-matched data streams are matched with the generic strings respectively; and the matching result is used to load the DFA in order to perform regex matching. In this way, the data that needs to be loaded in the matching process is reduced, the loading process is shortened, the time consumed by data loading in the process of regex matching is decreased, and the matching performance is improved.

Embodiment 3

Figure 4:
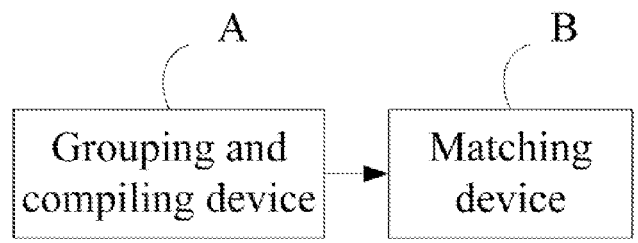
FIG. 4 is a schematic diagram showing a regex matching system according to the third embodiment of the present invention.

A regex matching system is provided in an embodiment of the present invention to shorten the time consumed by data loading in the regex matching process and improve the matching performance. As shown in FIG. 4, the system includes:

a grouping and compiling device A, configured to: sort multiple regexes into several regex groups, where all regexes in one regex group include a common string, which is known as a generic string; and compile each regex group into a DFA, and set up a correlation between the generic string of each regex group and the DFA; and a matching device B, configured to: match to-be-matched data streams with the generic string respectively, and use the matched generic string as a matched string; obtain a DFA corresponding to the matched string; and perform regex matching for the to-be-matched data streams according to the DFA, and output a matching result.

Figure 5:
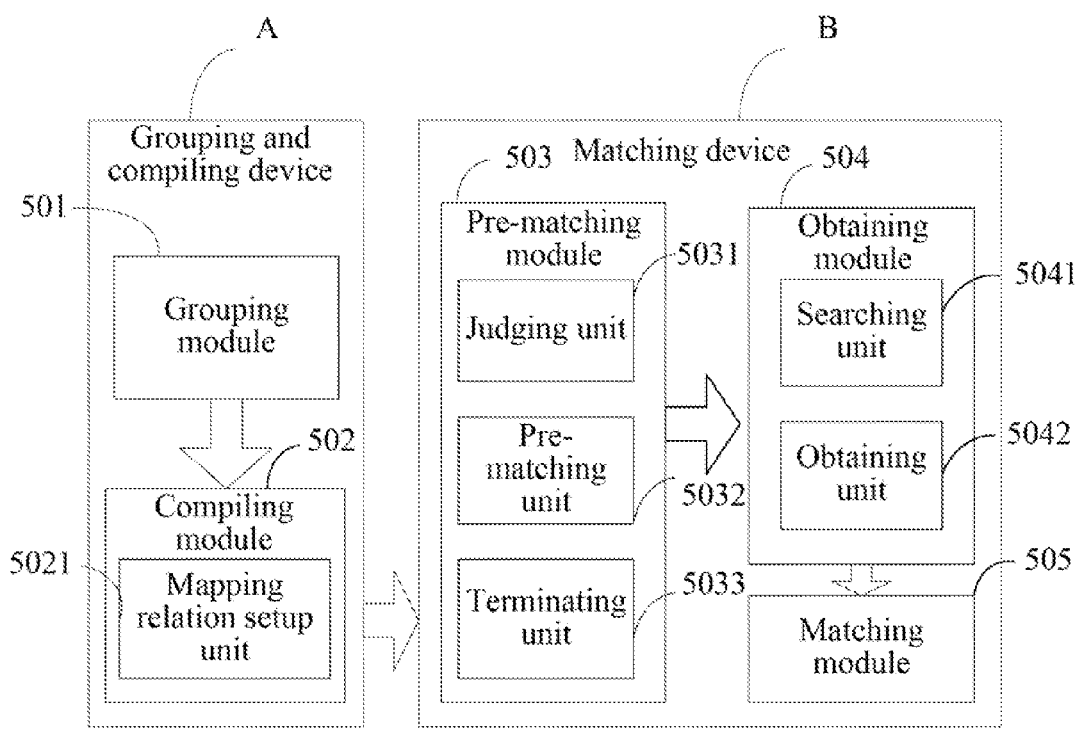
FIG. 5 is a schematic diagram a regex matching system according to the third embodiment of the present invention.

As shown in FIG. 5, the grouping and compiling device A includes:

a grouping module 501, configured to sort multiple regexes into several regex groups, where all regexes in one regex group include a common string, which is known as a generic string; and a compiling module 502, configured to compile each regex group sorted by the grouping module 501 into a DFA, and set up a correlation between the generic string of each regex group and the DFA.

The compiling module 502 includes:

a mapping relation setup unit 5021, configured to set up a mapping relation between the generic string of each regex group and the address for storing the DFA.

Preferably, the grouping and compiling device A is a computer.

Accordingly, the matching device B includes:

a pre-matching module, configured to match to-be-matched data streams with the generic string respectively, and use the matched generic string as a matched string;

The pre-matching module 503 includes:

a judging unit 5031, configured to: judge the to-be-matched data streams include any data that matches any of the generic strings; if the to-be-matched data streams include any data that matches any of the generic strings, trigger the pre-matching unit 5032 which uses the matched generic string as matched string; if the to-be-matched data streams do not include any data that matches any of the generic strings, trigger a terminating unit 5033 for terminating the matching;

an obtaining module 504, configured to obtain a DFA corresponding to the matched string and obtained by the pre-matching module 503.

The obtaining module 504 includes:

a searching unit 5041, configured to search, according to the mapping relation between the generic string and the address for storing the DFA, for the address for storing the DFA corresponding to the matched string;

an obtaining unit 5042, configured to obtain the DFA at the storage address found by the searching unit 5041; and a matching module 505, configured to perform regex matching for the to-be-matched data streams according to the DFA obtained by the obtaining module 504, and output a matching result.

Preferably, the matching device B is an FPGA in a programmable logical chip.

The system provided in this embodiment is based on the same conception as the method embodiment described above. For detailed implementation of the system, see the method embodiment above.

In this embodiment, multiple regexes are sorted into groups according to the string, and each regex group is compiled respectively so that multiple DFAs are obtained; the to-be-matched data streams are matched with the generic strings respectively; and the matching result is used to load the DFA in order to perform regex matching. In this way, the data that needs to be loaded in the matching process is reduced, the loading process is shortened, the time consumed by data loading in the process of regex matching is decreased, and the matching performance is improved.

Persons of ordinary skill in the art should understand that all or a part of the steps of the method according to the embodiments of the present invention may be implemented by a program instructing relevant hardware. The program may be stored in computer readable storage media. The storage media may be any media that are capable of storing program codes, such as a ROM, RAM, magnetic disk, or CD-ROM.

The above descriptions are merely some exemplary embodiments of the present invention, but are not intended to limit the scope of the present invention. Any modifications, variations or replacement that can be easily derived by those skilled in the art without departing from the spirit and scope of the invention shall fall within the protection scope of the present invention.

What is claimed is:

1. A regular expression (regex) matching method, comprising:

sorting multiple regexes into several regex groups, wherein all regexes in one regex group comprise a common string, which is known as a generic string;

compiling each regex group into a Deterministic Finite Automata (DFA), and setting up a correlation between the generic string of each regex group and the DFA, wherein the correlation between the generic string of each regex group and the DFA comprises: a mapping relation between the generic string of each regex group and an address for storing the DFA;

matching input data streams with the generic string respectively, and using the matched generic string as a matched string;

obtaining a DFA corresponding to the matched string; and performing regex matching for the input data streams according to the DFA, and outputting a matching result.

2. The method according to claim 1, wherein:

the obtaining of the DFA corresponding to the matched string comprises:

searching, according to the mapping relation between the generic string and the address for storing the DFA, for the address for storing the DFA corresponding to the matched string.

3. The method according to claim 1, wherein:

the matching of the input data streams with the generic string respectively and using the matched generic string as the matched string comprise:

judging the input data streams comprise any data that matches any of multiple generic strings; if the data streams comprise any data that matches any of multiple generic strings, using the matched generic string as the matched string; if the input data streams do not comprise any data that matches any of multiple generic strings, terminating the matching.

4. A regular expression (regex) matching system, comprising:

a processor; and a grouping and compiling device, configured to: sort multiple regexes into several regex groups, wherein all regexes in one regex group comprise a common string, which is known as a generic string; and compile each regex group into a Deterministic Finite Automata (DFA), and set up a correlation between the generic string of each regex group and the DFA, wherein the correlation between the generic string of each regex group and the DFA comprises: a mapping relation between the generic string of each regex group and an address for storing the DFA; and a matching device, configured to: match input data streams with the generic string respectively, and use the matched generic string as a matched string; obtain a DFA corresponding to the matched string; and perform regex matching for the input data streams according to the DFA, and output a matching result.

5. The system according to claim 4, wherein the grouping and compiling device comprises:

a grouping module, configured to sort multiple regexes into several regex groups, wherein all regexes in one regex group comprise a common string, which is known as a generic string; and a compiling module, configured to compile each regex group into a DFA, and set up a correlation between the generic string of each regex group and the DFA;

accordingly, the matching device comprises: a pre-matching module, configured to match the data streams with the generic string respectively, and use the matched generic string as a matched string;

an obtaining module, configured to obtain a DFA corresponding to the matched string; and a matching module, configured to perform regex matching for the input data streams according to the DFA, and output a matching result.

6. The system according to claim 5, wherein the compiling module comprises:

a mapping relation setup unit, configured to set up a mapping relation between the generic string of each regex group and an address for storing the DFA.

7. The system according to claim 6, wherein the obtaining module comprises:
- a searching unit, configured to search, according to the mapping relation between the generic string and the address for storing the DFA, for the address for storing the DFA corresponding to the matched string; and
- an obtaining unit, configured to obtain the DFA at the address.

8. The system according to claim 5, wherein the pre-matching module comprises:
- a judging unit, configured to: judge the data streams comprise any data that matches any of the generic strings; if the data streams comprise any data that matches any of the generic strings, trigger the pre-matching unit which uses the matched generic string as the matched string; if the input data streams do not comprise any data that matches any of the generic strings, trigger a terminating unit for terminating the matching.

9. A grouping and compiling device, configured to: sort multiple regexes into several regex groups, wherein all regexes in one regex group comprise a common string, which is known as a generic string; and compile each regex group into a Deterministic Finite Automata, DFA, and set up a correlation between the generic string of each regex group and the DFA, wherein the correlation between the generic string of each regex group and the DFA comprises: a mapping relation between the generic string of each regex group and an address for storing the DFA.

10. The device according to claim 9, wherein the device comprises:
- a grouping module, configured to sort multiple regexes into several regex groups, wherein all regexes in one regex group comprise a common string, which is known as a generic string; and
- a compiling module, configured to compile each regex group into a DFA, and set up a correlation between the generic string of each regex group and the DFA.

11. The device according to claim 10, wherein the compiling module comprises:
- a mapping relation setup unit, configured to set up a mapping relation between the generic string of each regex group and an address for storing the DFA.

* * * * *